US008598266B2

(12) United States Patent
Xu

(10) Patent No.: US 8,598,266 B2
(45) Date of Patent: Dec. 3, 2013

(54) FLOCCULATION AGENTS FOR NANOPARTICLE POLLUTANTS

(75) Inventor: Yanjie Xu, Longmont, CO (US)

(73) Assignee: Empire Technology Development LLC, Wilmington, DE (US)

( * ) Notice: Subject to any disclaimer, the term of this patent is extended or adjusted under 35 U.S.C. 154(b) by 101 days.

(21) Appl. No.: 13/322,082

(22) PCT Filed: Mar. 25, 2011

(86) PCT No.: PCT/US2011/030055
§ 371 (c)(1),
(2), (4) Date: Nov. 22, 2011

(87) PCT Pub. No.: WO2012/134432
PCT Pub. Date: Oct. 4, 2012

(65) Prior Publication Data
US 2012/0244052 A1 Sep. 27, 2012

(51) Int. Cl.
C09D 5/02 (2006.01)
(52) U.S. Cl.
USPC ............. 524/521; 524/432; 524/505; 525/88; 525/89; 525/90; 977/778
(58) Field of Classification Search
USPC ........ 524/431, 432, 505, 521; 525/88, 89, 90; 977/778
See application file for complete search history.

(56) References Cited

U.S. PATENT DOCUMENTS

| | | | |
|---|---|---|---|
| 3,707,466 | A | 12/1972 | Reinwald et al. |
| 3,951,888 | A | 4/1976 | Isayama et al. |
| 4,904,745 | A | 2/1990 | Inoue et al. |
| 6,379,501 | B1 | 4/2002 | Zhang et al. |
| 2004/0035800 | A1 | 2/2004 | Weir |
| 2005/0169957 | A1 | 8/2005 | Hossainy |
| 2010/0155310 | A1 * | 6/2010 | Enomura ............... 209/668 |
| 2011/0022129 | A1 * | 1/2011 | Prud'homme et al. ...... 607/88 |

FOREIGN PATENT DOCUMENTS

| | | |
|---|---|---|
| CN | 1986439 | 6/2007 |
| GB | 1 449 963 | 9/1976 |

OTHER PUBLICATIONS

Cho, M.S. et al., "Flocculation Characteristics of Copolymer of Acrylamide with Quaternary Ammonium Cationic Monomer (Running) Flocculation by Cationic polyacrylamide," J. Ind. Eng. Chem., 2002, vol. 8, No. 2, pp. 131-137.
Claesson, P.M. et al., "Polyelectrolyte-mediated surface interactions," Adv. Colloid. Interface Sci., 2005, available online Mar. 19, 2005, vol. 114-115, pp. 173-187.
Gutierrez, J. et al., "Hybrid titanium dioxide/PS-b-PEO block copolymer nanocomposites based on sol-gel synthesis," Nanotechnology, Mar. 12, 2008, vol. 19, 8 pages.
Hashizume, M. et al., "Preparation and functionalization of self-supporting (polymer/metal oxide) composite ultrathin films," Focused on Nanotechnology in RIKEN II, Aug. 2001, No. 38, pp. 36-39.
International Search Report and Written Opinion for PCT/US2011/030055 mailed Jun. 1, 2011.
Dhananjeyan, M.R. et al., "Photodynamics and Surface Characterization of $TiO_2$ and $Fe_2O_3$ Photocatalysts Immobilized on Modified Polyethylene Films," J. Phys. Chem. B., 2001, published on web Nov. 8, 2001, vol. 105, No. 48, pp. 12046-12055.
Kwon, S. et al., "Photocatalytic Applications of Micro- and Nano-TiO2 in Environmental Engineering," Critical Reviews in Environmental Science and Technology, 2008, vol. 38, pp. 197-226.
Larsson, A. et al., "Flocculation of cationic polymers and nanosized particles," Colloids and Surfaces A: Physicochemical and Engineering Aspects, 1999, vol. 159, pp. 65-76.
Maximova, N. et al., "Environmental implications of aggregation phenomena: Current understanding," Current Opinion in Colloid & Interface Science, 2006, available online Aug. 17, 2006, vol. 11, pp. 246-266.
Nikolopoulou, A. et al., "Solvothermal preparation of TiO2/saponite nanocomposites and photocatalytic activity," Applied Clay Science, 2009, available online Sep. 30, 2009, vol. 46, pp. 363-368.
Tripathy, T. et al., "Flocculation: A New Way to Treat the Waste Water," Journal of Physical Sciences, 2006, vol. 10, pp. 93-127.
Vinu, R. et al., "Photocatalytic degradation of poly(acrylamide-co-acrylic acid)," J. Phys. Chem. B., 2008, published on web Jul. 3, 2008, vol. 112, No. 30, pp. 8928-8935.
Wang, M. et al., "Precipitation of multilayered core-shell TiO2 composite nanoparticles onto polymer layers," J. Mater. Res., Mar. 2001, vol. 16, No. 3, pp. 765-773.
Wang, Y. et al., "Template Synthesis of Nanostructured Materials via Layer-by-Layer Assembly," Chem. Mater., 2008, published on web Dec. 11, 2007, vol. 20, No. 3, pp. 848-858.
Xiao, H., "Micro or nanoparticle-polymer flocculation systems," Encyclopedia of Surface and colloid Science, 2006, pp. 3871-3886.
Zhiyong, Y. et al., "Flexible polymer TiO2 modified film photocatalysts active in the photodegradation of azo-dyes in solution," Inorganica Chimica Acta, 2008, available online Jun. 10, 2007, vol. 361, pp. 589-594.

* cited by examiner

Primary Examiner — Peter D Mulcahy
(74) Attorney, Agent, or Firm — Foley & Lardner LLP

(57) ABSTRACT

The present technology relates to compositions comprising a copolymer comprising a poly($C_{2-4}$ alkylene oxide) and a cationic polyacrylamide, and a plurality of nanoparticles of titanium dioxide, zinc oxide or a mixture thereof. The compositions may serve as flocculating agents to remove neutral and negatively charged nanoparticle pollutants from gasses, including air, and liquids such as water.

24 Claims, No Drawings

FLOCCULATION AGENTS FOR NANOPARTICLE POLLUTANTS

CROSS REFERENCE TO RELATED APPLICATION

The present application is a national phase application claiming priority to International Application No. PCT/US2011/030055, the entire contents of which are incorporated by reference as if fully set forth herein.

BACKGROUND

Nanoparticles are particles with at least one dimension smaller than 100 nanometers (nm) and are created by both natural processes such as erosion and volcanoes, and human activities, such as combustion and the use of consumer products. Nanoparticles are pervasive in our daily life, present in air and drinking water. A growing body of evidence suggests that nanoparticles are harmful to humans. Hence, government scrutiny and regulation of nanoparticles is likely to increase and lead to the need for new ways to remove nanoparticles from air, water and other gasses and liquids.

SUMMARY

The present technology provides compositions that may be used as flocculation agents for nanoparticle pollutants in gas and liquid. A unique feature of these compositions is their ability to trap both charged and neutral nanoparticle pollutants. In addition, the present compositions can also degrade the nanoparticle pollutants upon exposure to ultraviolet (UV) light, allowing the pollutants to be safely disposed of in ordinary landfills.

In one aspect, the present technology provides compositions that include a copolymer comprising a poly($C_{2-4}$ alkylene oxide) and a cationic polyacrylamide, and a plurality of photocatalytic inorganic nanoparticles. In some embodiments, the poly($C_{2-4}$ alkylene oxide) has a weight average molecular weight below about 100,000, and in others, the poly($C_{2-4}$ alkylene oxide) has a weight average molecular weight ranging from about 100 to about 100,000. In an illustrative embodiment, the copolymer of the present composition comprises poly(ethylene oxide) and a cationic polyacrylamide. In some embodiments, the poly($C_{2-4}$ alkylene oxide) is joined to the cationic polyacrylamide through an acryloyl residue or a polyacrylate microsegment.

In some embodiments of the present compositions, the cationic polyacrylamide comprises primary amines, secondary amines, tertiary amines, quaternary amines, or a mixture of any two or more thereof. For example, the cationic polyacrylamide may include polyethyleneimine. In an illustrative embodiment, the cationic polyacrylamide may include a plurality of dialkylaminoalkyl groups or trialkylammonium alkyl groups. In some embodiments, the cationic polyacrylamide comprises a plurality of dialkylaminomethyl groups which are attached to amide nitrogens of the polyacrylamide. In an illustrative embodiment, the cationic polyacrylamide includes a plurality of dimethylaminomethyl, diethylaminomethyl, dimethylaminoethyl, dimethylaminoethyl, trimethylammonium methyl, triethylammonium methyl, trimethylammonium ethyl, or triethylammonium ethyl groups.

In other embodiments, the cationic polyacrylamide is a copolymer comprising the reaction product of acrylamide and one or more monomers selected from the group consisting of dimethylaminoethylmethacrylate, dimethylaminoethylacrylate, methacryloyloxyethyltrimethylammonium chloride, dimethylaminopropylmethacrylate, methacrylamidopropyl-trimethylammonium chloride, dimethylaminopropylacrylamide, acryloyloxyethyltrimethylammonium chloride, dimethaminoethylstyrene, (p-vinylbenzyl)-trimethylammonium chloride, acryloyloxyethyldimethylbenzyl ammonium chloride, 2-vinylpyridine, 4-vinylpyridine, and vinylamine.

In illustrative embodiments, the ratio of cationic monomers to neutral monomers in the cationic polyacrylamide is about 1:99 to about 20:80. In some embodiments, the cationic polyacrylamide has a weight average molecular weight of about 500 to about 15,000,000. In some embodiments of the present composition, the copolymer has a weight average molecular weight of about 5,000 to about 16,000,000.

In some embodiments of the present compositions, the photocatalytic inorganic nanoparticles are titanium dioxide, zinc oxide or mixture thereof. Such nanoparticles may be present in an amount ranging from but not limited to about 0.1 wt % to about 5 wt % of the composition.

In another aspect, the present technology provides methods for preparing any of the compositions described herein. The methods include contacting a copolymer and a suspension of photocatalytic inorganic nanoparticles in a liquid, wherein the copolymer comprises a poly($C_{2-4}$ alkylene oxide) and a cationic polyacrylamide, and the photocatalytic inorganic nanoparticles are selected from titanium dioxide, zinc oxide or a mixture thereof. The copolymer can be any of those described herein. In an illustrative embodiment, the liquid is water.

In another aspect, the present technology provides methods of removing nanoparticle pollutants from a gas (e.g., air) or liquid (e.g., water). The methods include contacting the gas or liquid to be purified with an effective amount of any of the compositions disclosed herein to trap a plurality of the nanoparticle pollutants. In some embodiments of the present methods, the amount of the composition used to remove the nanoparticle pollutants ranges from about 0.01 to about 2 kg per metric ton of liquid. The methods of removing nanoparticle pollutants may further include exposing the composition and trapped nanoparticles to an amount of UV light sufficient to oxidize or otherwise degrade a plurality of the trapped nanoparticles.

The foregoing summary is illustrative only and is not intended to be in any way limiting. In addition to the illustrative aspects, embodiments, and features described above, further aspects, embodiments, and features will become apparent by reference to the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present technology provides compositions that may be used as flocculating agents to remove nanoparticle pollutants from gasses (including air) or liquids (including water). The compositions include a copolymer that includes at least two distinct microsegments, a poly(alkylene oxide) and a cationic polyacrylamide. Photocatalytic inorganic nanoparticles of titanium dioxide, zinc oxide or mixtures of both are associated with or bound to the copolymer through interactions with the poly(alkylene oxide).

The poly(alkylene oxide) may be a poly($C_{2-4}$ alkylene oxide) such as poly(ethylene oxide), poly(propylene oxide) or poly(butylene oxide). Poly($C_{2-4}$ alkylene oxide) having a wide range of molecular weights may be used. In an illustrative embodiment, the poly($C_{2-4}$ alkylene oxide) has a weight average molecular weight below about 100,000. (Herein, all molecular weights are given in Daltons.) For example, poly($C_{2-4}$ alkylene oxide) may have a weight average molecular weight ranging from about 100 about 100,000, from about 100 to about 50,000 from about 100 to about 10,000, from about 100 to about 5,000, from about 100 to about 2,000, from about 500 to about 100,000, from about 500 to about 50,000, from about 500 to about 25,000, from about 500 to about 15,000, from about 500 to about 10,000, from about 500 to about 5,000, from about 500 to about 2,000, from about 1,000 to about 50,000, from about 1,000 to about 25,000, from about 2,000 to about 20,000, or from about 4,000 to about 15,000. Example molecular weights include about 200, about 500, about 1,000, about 1,500, about 2,000, about 3,000, about 4,000, about 5,000, about 6,000, about 8,000, about 10,000, about 15,000, about 20,000, about 25,000, about 30,000, about 50,000 and ranges between any two of these values. In some embodiments the poly($C_{2-4}$ alkylene oxide) is a polyethylene glycol or polypropylene glycol having a weight average molecular weight ranging from about 4,000 to about 20,000. Such poly(alkylene oxide)s may be readily made by known methods (see, e.g., U.S. Pat. Nos. 3,951,888 and 4,904,745), and a number of materials are commercially available (e.g., CARBOWAX polyethylene glycols from Dow Chemical Company). In some embodiments, the polyalkylene oxide terminates in a $C_{1-12}$ alkyl ether group at one end such as, for example, mono-methyl ether, mono-ethyl ether, mono-propyl, mono-butyl ether and the like.

Copolymers of the present technology may be readily made by first preparing, e.g., a monoacrylate ester of the polyalkylene oxide. This may be done by reacting an acrylic acid or acrylic acid ester (or derivatives thereof, e.g., methacrylic acid) with the polyalkylene oxide to form the terminally substituted polymer shown in Scheme 1 (wherein each R is independently H or an alkyl group, R' is H or methyl and each R" is independently H or methyl). Any suitable acid may be used as a catalyst for the reaction including, but not limited to sulfuric acid, benzene sulfuric acid, hydrochloric acid, hydrobromic acid, phosphoric acid, or ion exchange resins in acid form, such as AMBERLYST (sulfonated polystyrene/divinylbenzene copolymers), NAFION (sulfonated fluoropolymers/copolymers), and the like. The reaction may be carried out with or without solvent, e.g., tetrahydrofuran. Water formed during the reaction may be removed under reduced pressure, in vacuo or by distillation at ambient pressure. To prevent polymerization during the esterification, polymerization inhibitors may be employed in accordance with standard techniques in the art. Polymerization inhibitors which may be used include but are not limited to nitrobenzene, 1,3,5-trinitrobenzene, p-benzoquinone, and the like.

Scheme 1

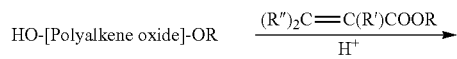

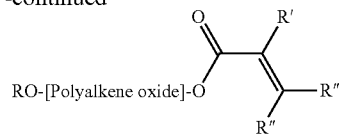

The copolymer may then be formed by co-polymerizing a mixture of the acrylate esters of (polyalkylene)oxide described herein and an acrylamide including or substituted with primary amines, secondary amines, tertiary amines and/or quaternary amines. As used herein, "primary amines," "secondary amines," "tertiary amines" and "quaternary amines" refer to, respectively, amino groups attached to one, two, three or four organic ligands such as alkyl, aryl, arylalkyl groups. Amino groups may include dialkylaminoalkyl groups and/or trialkylammonium alkyl groups, such as, but not limited to, dimethylaminomethyl, diethylaminomethyl, dimethylaminoethyl, dimethylaminoethyl, trimethylammonium methyl, triethylammonium methyl, trimethylammonium ethyl, and triethylammonium ethyl groups. The copolymerization may include other vinylic monomers such as acrylates and styrenes.

As used herein, the term "alkyl group" refers to $C_{1-6}$ straight or branched or $C_{3-5}$ cyclic saturated hydrocarbon groups. By way of non-limiting example, alkyl groups include methyl, ethyl, propyl (including n-propyl, isopropyl and cyclopropyl), butyl (including n-butyl, isobutyl, secbutyl, and cyclobutyl), pentyl (including n-pentyl, isopentyl, cyclopentyl and the like), and hexyl (including n-hexyl, isohexyl, cyclohexyl and the like).

As used herein, the term "aryl group" refers to $C_{6-12}$ aromatic ring systems which include at least one aromatic ring. Aryl groups may include a single aromatic ring or two rings. By way of non-limiting example, aryl groups include phenyl and naphthyl groups as well as indenes, dihydroindenes, and other bicyclic rings in which at least one of the rings is aromatic, such as phenyl.

As used herein, the term "arylalkyl group" refers to an alkyl group as defined above in which a hydrogen has been substituted with an aryl group as defined above. Arylalkyl groups include, by way of non-limiting example, benzyl, phenylethyl, and naphthylmethyl groups.

Cationic monomers that may be used to prepare copolymers of the present technology include, without limitation, dimethylaminoethylmethacrylate (DMAEM), dimethylaminoethylacrylate (DMAEA), methacryloyloxyethyltrimethylammonium chloride (METAC), dimethylaminopropylmethacrylate (DMAPMA), methacrylamidopropyltrimethylammonium chloride (MAPTAC), dimethylaminopropylacrylamide (DMAPAA), acryloyloxyethyltrimethylammonium chloride (AETAC), dimethaminoethylstyrene, (p-vinylbenzyl)-trimethylammonium chloride, acryloyloxyethyldimethylbenzyl ammonium chloride, 2-vinylpyridine, 4-vinylpyridine, and vinylamine. In some embodiments the cationic monomers are selected from the group consisting of dimethylaminoethylmethacrylate (DMAEM), dimethylaminoethylacrylate (DMAEA), methacryloyloxyethyltrimethylammonium chloride (METAC), dimethylaminopropylmethacrylate (DMAPMA), methacrylamidopropyl-trimethylammonium chloride (MAPTAC), dimethylaminopropylacrylamide (DMAPAA), and acryloyloxyethyltrimethylammonium chloride (AETAC).

The ratio of cationic monomers to acrylamide may be adjusted to provide cationic polyacrylamide microsegments having differing charge densities within the copolymer. In some embodiments the ratio of cationic monomers to neutral monomers in the cationic polyacrylamide may range from about 1:99 to about 20:80, or from about 1:99 to about 10:90 or about 15:85. In other embodiments, the ratio of cationic monomers to neutral monomers in the cationic polyacrylamide may range from any of about 2:98, about 3:97, about 4:96, about 5:95, about 6:94, about 7:93, or about 8:92 to any of about 10:90, about 12:88, about 14:86, about 16:84, about 18:82 or about 20:80.

The copolymerization to produce cationic polyacrylamide linked to poly(alkylene oxide) can be carried out using standard techniques. The copolymerization may be carried out in water with thermal initiation using initiators such as, without limitation, azo compounds (e.g., 2,2'-azobisisobutyronitrile (AIBN), 4,4-azobis(4-cyanovaleric acid), 1,1'-azobis(cyclohexanecarbonitrile)); peroxides such as, but not limited to acyl peroxides (e.g., acetyl peroxide, benzoyl peroxide), aryl and arylalkyl peroxides (e.g., benzyl peroxide, cumyl peroxides such as dicumyl peroxide and t-butyl cumyl peroxide), alkyl peroxides (e.g., t-butyl hydroperoxide); and persulfates (e.g., potassium persulfate). Other classes of initiators may be used as well, including redox initiators or photoinitiators. Redox initiators include but are not limited to: peroxides in combination with a reducing agents such as metal ions (e.g., $Fe^+$, $Cr^{2+}$, $V^{2+}$, $Ti^{3+}$, $Co^{2+}$, and $Cu^+$; metal ions or other inorganic reductants in combination with inorganic oxidants; $HSO_3^-$, $SO_3^{2-}$ and $S_2O_5^{2-}$ in combination with inorganic oxidants, e.g., $Ag^+$, $Cu^{2+}$, $Fe^{3+}$, $ClO_3^-$. Photoinitiators include acetophenones (e.g., acetophenone, 1-hydroxycyclohexyl phenyl ketone, 2,2-diethoxyacetophenone), benzophenones (e.g., 2-methylbenzophenone, 4,4'-bis(diethylamino) benzophenone, 4-hydroxybenzophenone), benzil and benzoins (e.g., 4,4'-dimethylbenzil, benzoin, benzoin methyl ether), and the like. Many thermal and redox initiators may also be used as photoinitiators as well. Polymer chain growth may be controlled by addition of chain transfer agents such as the same sorts of peroxides used as initiators. Other chain transfer agents which may be used include without limitation: thiols (e.g., n-butyl mercaptans), halocarbons (e.g., carbon tetrachloride and carbon tetrabromide), and the like.

Alternatively, cationic polyacrylamides may be prepared from polyamines such as, but not limited to polyethyleneimine, polypropyleneimine and polybutyleneimine, any of which may linear or branched (e.g., with ethylenediamine caps. Such polyamines may be end-capped with one or more acrylic monomers to provide acrylamide-containing oligomers that may be copolymerized with the acrylate containing poly(alkylene oxide) and/or additional acrylic monomers to provide copolymers of the present technology. Thus, e.g., the poly($C_{2-4}$ alkylene oxide) will be joined to the cationic polyacrylamide through an acryloyl residue or, when acrylic monomers (e.g., acrylic acid, methacrylic acid, methyl acrylate, methyl methacrylate, and the like) are included in the reaction, a polyacrylate microsegment.

The cationic polyacrylamide oligomer or microsegment may have a wide range of molecular weights. In some embodiments, the cationic polyacrylamide has a weight average molecular weight ranging from about 500 to about 15,000,00. In others, the copolymer has a weight average molecular weight ranging from about 250,000 to about 10,000,000, from about 500,000 to about 15,000,000, from about 500,000 to about 10,000,000, from about 1,000,000 to any one of about 8,000,000, 10,000,000 or 12,000,000. Example molecular weights include about 500, about 1,000, about 2,000, about 5,000, about 10,000, about 25,000, about 50,000, about 100,000 about 250,000, about 500,000, about 1,000,000, about 2,000,000, about 3,000,000, about 4,000,000, about 5,000,000, about 6,000,000, about 7,000,000, about 8,000,000, about 9,000,000, about 10,000,000, about 11,000,000, about 12,000,000, and ranges between any two of these values.

Thus, copolymers of the present compositions may have weight average molecular weight ranging from about 5,000 to about 16,000,000, from about 50,000 to about 15,000,000, from 1,000,000 to about 15,000,000, or from about 1,000,000 to about 10,000,000. Example molecular weights include about 5,000, about 10,000, about 50,000, about 100,000, about 500,000, about 1,000,000, about 2,000,000, about 3,000,000, about 4,000,000, about 5,000,000, about 6,000,000, about 7,000,000, about 8,000,000, about 9,000,000, about 10,000,000, about 11,000,000, about 12,000,000, about 13,000,000, about 14,000,000, about 15,000,000, about 16,000,000, and ranges between any two of these values. Those skilled in the art will be able to select the appropriate weight average molecular weight for the flocculation application at hand in view of the present disclosure and the knowledge in the art. For example, where the composite will be fabricated into a self-standing film, the weight average molecular weight will need to be sufficiently high to provide good mechanical properties, e.g., from about 15,000 to about 2,500,000.

Compositions of the present technology include nanoparticles of inorganic photocatalytic materials such as, e.g., titanium dioxide, zinc oxide or mixtures of both. The photocatalytic nanoparticles are associated with or bound to the copolymer through interactions with the poly(alkylene oxide). The photocatalytic nanoparticles may be present in the present compositions in an amount ranging from but not limited to about 0.1 wt % to about 5 wt %, or from any of about 0.2 wt %, about 0.3 wt %, about 0.4 wt % or about 0.5 wt % to any of about 1 wt %, about 2 wt %, about 3 wt %, about 4 wt % or about 5 wt % of the total composition. Example percentages include about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.5 wt %, about 2 wt %, about 3 wt %, about 4 wt %, about 5 wt %, and ranges between any two of these values. In some embodiments the photocatalytic inorganic nanoparticles are titanium dioxide. While not wishing to be bound by theory, it is believed that upon exposure to light, especially UV light, the inorganic nanoparticles can catalyze the degradation of nanoparticulate pollutants that have been flocculated by the copolymer.

Compositions of the present technology may be prepared by associating nanoparticles of photocatalytic inorganic materials with the copolymers disclosed herein. In particular, titanium dioxide, zinc oxide or a mixture of the two may be associated with the copolymer by simple procedures. To make the composition, the copolymer may be soaked in an aqueous suspension of the photocatalytic nanoparticles at, e.g., room temperature for a short time (e.g., a few minutes to a few hours). The exact concentration of nanoparticles in the suspension is not critical; it may range, e.g., from about 1 wt % to about 2 wt %. Depending on the solubility of the copolymer, the procedure may also be carried out in other solvents including but not limited to tetrahydrofuran, isopropanol, or aqueous mixtures thereof. In some embodiments the suspension is in water without added cosolvents. After soaking for a sufficient time, the copolymer may then be rinsed and dried. The rinsing step removes the nanoparticles not bound or only loosely bound to the copolymer and may be carried out with water or other solvent(s). The resulting composition (composite) may be dried under ambient conditions ("air dried"), or under reduced pressure and/or at elevated temperature.

Once dried, the composition is ready for use as a nanoparticle flocculating agent. In view of the photocatalytic nature of the present compositions, it will be understood that it may be desirable to protect them from UV light as much as practicable until use.

The flocculant, prepared as disclosed herein, may be used to remove nanoparticle pollutants from a gas or liquid. Thus, gas may be passed through an effective amount the present flocculant in powder form, fiber form, film form, or through a column containing one or more of such forms. By "effective amount" is meant an amount that will remove a measurable quantity of the nanoparticles from the gas or liquid being cleaned. Thus, e.g., one may use about 0.01 kg to about 2 kg of the present flocculants per metric ton of liquid or per 100,000 liters of gas. In some embodiments, the amount of the composition used to remove the nanoparticle pollutants ranges from any of about 0.02, about 0.05, about 0.1, about 0.2 or about 0.5 kg/metric ton to any of about 1, about 1.2, about 1.5, about 1.8 or about 2 kg per metric ton of liquid or 100,000 liters of gas. In some embodiments, the effective amount is about 0.1 kg to about 1 kg per metric ton of liquid or per 100,000 liters of gas. Gasses that may be cleansed of nanoparticles this way include air, nitrogen, oxygen, carbon dioxide and the like. Liquids that my be cleaned include water, greywater, industrial effluent, organic solvents and the like.

After flocculation of the nanoparticle pollutants, the flocs may be exposed to an amount of UV light sufficient to oxidize or otherwise degrade the trapped nanoparticles. Under these conditions, it is expected that the photocatalytic inorganic nanoparticles (e.g., titanium dioxide and zinc oxide) will oxidize and degrade trapped pollutants including toxic organic compounds including but not limited to chlorophenols, volatile organic compounds from various chemical processes, nitrous oxides, sulfur dioxide, and other nanoparticulates.

EXAMPLES

The present technology is further illustrated by the following examples, which should not be construed as limiting in any way.

Example 1

Preparation of a Polyethylene Oxide with a Terminal Acryloyl Residue

Methoxy polyethyleneglycol (n=9) 1060 parts (2.5 moles), methacrylic acid 430 parts (5 moles), p-benzoquinone 2.2 parts and 98% concentrated sulfuric acid (same concentrated sulfuric acid hereinafter) 3.5 parts are placed inside a reactor. Temperature is increased gradually while stirring and pressure is lowered. While water being generated in the esterification reaction is removed out of the reacting system by distillation as azeotropic water/methacrylic acid mixture, the esterification reaction is continued for 2 hours under the conditions of temperature at 125-130° C. and pressure at 12–2.5 kPa. Next, the remaining excess portion of methacrylic acid is removed by distillation by further reducing the pressure to obtain a product. This product may be analyzed and will be identified as polyether ester oligomer (P-1) with a hydroxyl value of about 1.3, a carboxyl value of about 1.2, an esterification reaction rate (hereinafter calculated from the hydroxyl value) of about 99%.

Example 2

Preparation of Poly(ethylenimine) with acrylamide endcaps

Poly(ethylenimine), ethylenediamine end-capped (from Aldrich, Mw=800), 800 parts (1 mole), methacrylic acid 430 parts (5 moles), p-benzoquinone 2.2 parts and 98% concentrated sulfuric acid (same concentrated sulfuric acid hereinafter) 3.5 parts are placed inside a reactor. Temperature is increased gradually while stirring and pressure is lowered. While water being generated in the reaction is removed out of the reacting system by distillation as azeotropic water/methacrylic acid mixture, the reaction is continued for 2 hours under the conditions of temperature at 125-130° C. and pressure at 12–2.5 kPa. Next, the remaining excess portion of methacrylic acid is removed by distillation by further reducing the pressure to obtain a product. This product may be analyzed and will be identified as poly(ethylenimine) acrylamide oligomer with acrylamide endcaps (P-2).

Example 3

Preparation of a poly(ethylene oxide)-cationic poly(ethylenimine) polyacrylamide copolymer Polyether ester (P-1), obtained in Example 1, (76 parts, 0.15 moles), methacrylic acid (56 parts, 0.65 moles) and the poly(ethylenimine) acrylamide (P-2), obtained in Example 2 (76 parts, 0.15 moles), 3-mercaptopropionic acid, 2.1 parts, and water, 330 parts, are combined in a mixture. After the components of the mixture are dissolved uniformly by stirring, the atmosphere over the resulting solution is replaced with nitrogen. While the temperature of the reacting system is maintained at 80° C. in the nitrogen environment by means of a warm bath, polymerization is started by drop-wise addition of a 20% aqueous solution of sodium persulfate, 8 parts. The polymerization reaction is continued for about 5 hours and an aqueous solution of water-soluble vinyl copolymer is obtained. This water-soluble vinyl copolymer is analyzed and identified as water-soluble vinyl copolymer (D-1) with average numerical molecular weight of 12,500 having about 15-20 molar % of a component unit derived from polyether ester monomer (P-1), about 15-20 molar % of a component unit derived from polyethlylenimine acrylamide (P-2) and about 60-65 molar % of a component unit derived from methacrylic acid. D-1 is acidified with 5% HCl solution, followed by washing with a large amount of water to give the protonated polymer, D-2.

Example 4

Preparation of a poly(ethylene oxide)-cationic polyacrylamide/TiO2 nanoparticle flocculant Into the aqueous solution of the polymer D-2 produced according to the procedure of Example 3, is added a suspension of $TiO_2$ nanoparticles having an average particle size of 10 nm and a specific surface area of >100 $m^2$/g (commercially available from Alpha Nanomaterials, Los Angeles, Calif.). The mixture is vigorously stirred for 20 minutes. The water is removed from the mixture under reduced pressure. The resulting polymer composite is rinsed with large amount of fresh water, to remove the polymerization additives and $TiO_2$ loosely adsorbed onto the polymer surface. Then the composite dried in an oven and/or under vacuum over night.

Example 5

Removal of nanoparticle pollutants from air using a poly(ethylene oxide)-cationic polyacrylamide/TiO$_2$ nanoparticle flocculant The copolymer composite may be taken up in water or a suitable solvent and, using standard techniques, the solution may be cast as a film (including a self-standing film), coated on the inside of a plastic or metal tube or used to impregnate a woven or nonwoven fiber support. Alternatively, the solution may be coated onto particles of a suitable substrate (e.g., silica) or the dry composite may be ground into particles and used to fill a column. When air or liquid is, e.g., passed through a tube coated or filled with the composite, nanoparticles will be removed from the air or liquid. Subsequent exposure of the loaded composite to UV light degrades the nanoparticle pollutants.

EQUIVALENTS

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A composition comprising:
a copolymer comprising a poly($C_{2-4}$ alkylene oxide) and a cationic polyacrylamide; and
a plurality of photocatalytic inorganic nanoparticles.

2. The composition of claim 1 wherein the copolymer comprises poly(ethylene oxide) and cationic polyacrylamide.

3. The composition of claim 1 wherein the poly($C_{2-4}$ alkylene oxide) is joined to the cationic polyacrylamide through an acryloyl residue or a polyacrylate microsegment.

4. The composition of claim 1 wherein the poly($C_{2-4}$ alkylene oxide) has a weight average molecular weight of less than about 100,000.

5. The composition of claim 1 wherein the poly($C_{2-4}$ alkylene oxide) has a weight average molecular weight ranging from about 100 to about 100,000.

6. The composition of claim 1 wherein the poly($C_{2-4}$ alkylene oxide) terminates in a $C_{1-12}$ alkyl ether at one end.

7. The composition of claim 1 wherein the cationic polyacrylamide comprises primary amines, secondary amines, tertiary amines, quaternary amines or a mixture of any two or more thereof.

8. The composition of claim 1 wherein the cationic polyacrylamide comprises polyethyleneimine.

9. The composition of claim 1 wherein the cationic polyacrylamide comprises a plurality of dialkylaminoalkyl groups or trialkylammonium alkyl groups.

10. The composition of claim 1 wherein the cationic polyacrylamide comprises a plurality of dimethylaminomethyl, diethylaminomethyl, dimethylaminoethyl, dimethylaminoethyl, trimethylammonium methyl, triethylammonium methyl, trimethylammonium ethyl, or triethylammonium ethyl groups.

11. The composition of claim 1 wherein the cationic polyacrylamide comprises a plurality of dialkylaminomethyl groups which are attached to amide nitrogens of the polyacrylamide.

12. The composition of claim 1 wherein the cationic polyacrylamide is a copolymer comprising the reaction product of acrylamide and one or more monomers selected from the group consisting of dimethylaminoethylmethacrylate (DMAEM), dimethylaminoethylacrylate (DMAEA), methacryloyloxyethyltrimethylammonium chloride (METAC), dimethylaminopropylmethacrylate (DMAPMA), methacrylamidopropyl-trimethylammonium chloride (MAPTAC), dimethylaminopropylacrylamide (DMAPAA), acryloyloxyethyltrimethylammonium chloride (AETAC), dimethaminoethylstyrene, (p-vinylbenzyl)-trimethylammonium chloride, acryloyloxyethyldimethylbenzyl ammonium chloride, 2-vinylpyridine, 4-vinylpyridine, and vinylamine.

13. The composition of claim 12 wherein the ratio of cationic monomers to neutral monomers in the polyacrylamide is about 1:99 to about 20:80.

14. The composition of claim 1 wherein the cationic polyacrylamide has a weight average molecular weight of about 500 to about 15,000,000.

15. The composition of claim 1 wherein the copolymer has a weight average molecular weight of about 5,000 to about 16,000,000.

16. The composition of claim 1, wherein the photocatalytic inorganic nanoparticles are titanium dioxide, zinc oxide or a mixture thereof.

17. The composition of claim 1 wherein the photocatalytic inorganic nanoparticles are present in an amount of about 0.1 wt % to about 5 wt % of the composition.

18. A method of preparing a composition, the method comprising contacting a copolymer and a suspension of photocatalytic inorganic nanoparticles in a liquid, wherein the copolymer comprises a poly($C_{2-4}$ alkylene oxide) and a cationic polyacrylamide.

19. The method of claim 18, wherein the liquid is water.

20. The method of claim 18, wherein the photocatalytic inorganic nanoparticles are titanium dioxide, zinc oxide, or a mixture thereof.

21. A method of removing nanoparticle pollutants from a gas or liquid, the method comprising contacting the gas or liquid with an effective amount of the composition to trap a plurality of the nanoparticle pollutants, wherein the composition comprises a copolymer comprising a poly($C_{2-4}$ alkylene oxide) and a cationic polyacrylamide; and a plurality of photocatalytic inorganic nanoparticles.

22. The method of claim 21 wherein the amount of the composition used is about 0.01 to about 2 kg/metric ton of liquid.

23. The method of claim 21 wherein the gas is air or the liquid is water.

24. The method of claim 21 further comprising exposing the composition and trapped nanoparticles to an amount of UV light sufficient to oxidize or otherwise degrade a plurality of the trapped nanoparticle pollutants.

\* \* \* \* \*

UNITED STATES PATENT AND TRADEMARK OFFICE
CERTIFICATE OF CORRECTION

| | |
|---|---|
| PATENT NO. | : 8,598,266 B2 |
| APPLICATION NO. | : 13/322082 |
| DATED | : December 3, 2013 |
| INVENTOR(S) | : Xu |

It is certified that error appears in the above-identified patent and that said Letters Patent is hereby corrected as shown below:

In the Specification:

In Column 4, Line 26, delete "$C_{3-5}$" and insert -- $C_{3-6}$ --, therefor.

In Column 7, Line 25, delete "my be" and insert -- may be --, therefor.

In Column 8, Line 46, delete "polyethlylenimine" and insert -- polyethylenimine --, therefor.

Signed and Sealed this
Fifteenth Day of April, 2014

Michelle K. Lee
*Deputy Director of the United States Patent and Trademark Office*